(12) United States Patent
Grampassi

(10) Patent No.: US 10,039,297 B2
(45) Date of Patent: Aug. 7, 2018

(54) APPARATUS FOR PREPARING AND DISPENSING FOOD PRODUCTS

(71) Applicant: S.P.M. DRINK SYSTEMS S.P.A., Spilamberto (MO) (IT)

(72) Inventor: Enrico Grampassi, Spilamberto (IT)

(73) Assignee: S.P.M. DRINK SYSTEMS S.P.A., Spilamberto (IT)

( * ) Notice: Subject to any disclaimer, the term of this patent is extended or adjusted under 35 U.S.C. 154(b) by 89 days.

(21) Appl. No.: 14/879,640

(22) Filed: Oct. 9, 2015

(65) Prior Publication Data

US 2017/0086477 A1 Mar. 30, 2017

(30) Foreign Application Priority Data

Sep. 30, 2015 (IT) .......................... 102015000057085

(51) Int. Cl.

| | | |
|---|---|---|
| *B65D 5/66* | (2006.01) | |
| *A23G 9/22* | (2006.01) | |
| *A23G 9/28* | (2006.01) | |
| *A47J 31/44* | (2006.01) | |
| *B67D 3/00* | (2006.01) | |
| *B67D 1/08* | (2006.01) | |
| *G07F 9/02* | (2006.01) | |
| *G07F 13/10* | (2006.01) | |
| *G07F 13/06* | (2006.01) | |
| *G07F 17/00* | (2006.01) | |

(52) U.S. Cl.
CPC ............... *A23G 9/224* (2013.01); *A23G 9/22* (2013.01); *A23G 9/28* (2013.01); *A47J 31/44* (2013.01); *B67D 1/0872* (2013.01); *B67D 3/0096* (2013.01); *G07F 9/023* (2013.01); *G07F 13/06* (2013.01); *G07F 13/10* (2013.01); *G07F 17/0071* (2013.01); *B67D 2210/00031* (2013.01)

(58) Field of Classification Search
CPC ............ A23G 9/224; A23G 9/28; A47J 31/44
USPC ....................... 222/113, 78; 362/97.1; 40/541
See application file for complete search history.

(56) References Cited

U.S. PATENT DOCUMENTS

| | | | | |
|---|---|---|---|---|
| 5,099,403 | A * | 3/1992 | Turner ...................... | F21V 7/10 222/113 |
| 5,726,722 | A * | 3/1998 | Uehara ................. | F21V 19/008 349/64 |
| 5,881,917 | A * | 3/1999 | Jones ....................... | B67D 1/06 200/82 R |
| 6,334,328 | B1 * | 1/2002 | Brill ........................ | A23G 9/045 62/347 |
| 6,536,924 | B2 * | 3/2003 | Segretto .................. | F21S 2/005 362/247 |
| 8,245,739 | B1 | 8/2012 | Wade et al. | |
| 2009/0034232 | A1 * | 2/2009 | Larsson ................... | B67D 7/86 362/96 |

FOREIGN PATENT DOCUMENTS

| | | |
|---|---|---|
| EP | 2508080 A1 | 10/2012 |
| WO | 01/25135 A1 | 4/2001 |

(Continued)

*Primary Examiner* — Jeremy W Carroll
(74) *Attorney, Agent, or Firm* — McGlew and Tuttle, P.C.

(57) ABSTRACT

An apparatus for preparing and dispensing food products includes at least one containment tank (2) predisposed to contain the product to be prepared and mounted on a base body (10) which is closed at the front by a panel (12) of transparent or opaque material, backlit through LED lighting structure (13).

20 Claims, 3 Drawing Sheets

(56) References Cited

FOREIGN PATENT DOCUMENTS

| WO | 03/042612 A2 | 5/2003 |
|---|---|---|
| WO | 03/082022 A1 | 10/2003 |
| WO | 2013/050391 A1 | 4/2013 |

* cited by examiner

APPARATUS FOR PREPARING AND DISPENSING FOOD PRODUCTS

TECHNICAL FIELD

The present invention concerns an apparatus for preparing and dispensing food products, such as hot beverages or refrigerated products of the type of creamy ice-creams, sorbets and the like.

BACKGROUND ART

Nowadays, apparatuses are known that allow to prepare and dispense refrigerated products of the type of traditional water-based water ice or alternatively creamy products such as creamy ice-creams, sorbets, coffee creams.

These known apparatuses are generally constituted by a tank suitable to contain the product to be prepared and dispensed, wherein a cooling device for cooling the product to the appropriate temperature and a mixing device that causes the continuous circulation of the product inside the tank are arranged. The circulation device, consisting for example of a screw member driven in rotation according to an axis longitudinal to the tank, is predisposed to convey the cooled product towards a front zone, where a dispensing device for the product is arranged. The dispensing device is provided with an obturator element that can be operated by means of an external lever member.

The cooling device is usually constituted by a coil evaporator arranged inside a tubular body, substantially cylindrical, arranged according to the horizontal axis of the tank. The evaporator is connected to a refrigerating unit housed inside a base body on which the containment tank for the product is mounted. The screw member of the mixing device winds on the tubular body of the evaporator.

An apparatus for dispensing refrigerated products of such type is disclosed for example in international application WO 03/082022.

Apparatuses are also known that allow to produce and dispense hot beverages, in particular beverages obtained by mixing water with soluble products in previously set doses. These apparatuses are generally provided with a heating boiler for water, with one or more containers for the soluble products and with a mixing device for dosed quantity of water and soluble product. A dispensing device, arranged in a front zone of the apparatus, allows to dispense the so prepared hot beverage.

The cited apparatuses have a well-established and recognizable structure. Therefore, the need is felt for innovative technical features that allows to customize the same apparatus.

DISCLOSURE

The task of the present invention is that of solving the aforementioned problem, devising an apparatus for preparing and dispensing food products, such as hot beverages and refrigerated products, provided with technical innovative features that give the user a high level of customization.

Another scope of the present invention is that of providing an apparatus for preparing and dispensing food products having a simple conception, a securely reliable functioning and versatile use, as well as relatively economic costs.

The cited scopes are attained, by the apparatus for preparing and dispensing food products according to the present invention.

According to the present invention, the apparatus for preparing and dispensing food products comprises at least one containment tank predisposed to contain the product to be prepared and mounted on a base body that is closed at the front by a panel of transparent or opaque material, backlit by lighting means.

Preferably, said panel is made of polycarbonate.

Preferably, said lighting means are of LED type.

In an embodiment, said lighting means are arranged vertically aligned at opposite sides of said panel.

Alternatively, said lighting means are arranged vertically aligned in a zone substantially median of said panel.

In an advantageous embodiment, in front of said backlit panel, inside the base body, a deflector member is arranged predisposed to spread the light emitted by said lighting means.

In an embodiment, said deflector member comprises a plate having a concave surface directed toward said panel.

In particular, said concave surface of the plate is defined by a central portion and by respective side portions vertically extended in assembly position, said side portions being symmetrically angled with respect to the central portion.

Alternatively, said concave surface of the plate is defined by a cylindrical sector extended along a vertical axis in assembly position.

Preferably, said lighting means are mounted on a support that extends vertically in front of said deflector member, in position median with respect to said base body.

In an advantageous embodiment, said deflector member comprises a plate having a flat surface arranged on a plane substantially parallel to said backlit panel, inside said base body.

Preferably, said lighting means are mounted along the upper side and along the lower side of said flat plate on support means protruding from the same plate.

Said deflector spreads the light emitted by said lighting means so as to obtain a uniform lighting on the whole front panel.

In an embodiment, the apparatus comprises a mixing device arranged inside said containment tank and predisposed to cause the continuous circulation of the product inside the same tank, to convey the product towards a front zone of said tank, and a dispensing device of the product, arranged at said front zone of the tank.

In an embodiment, the apparatus comprises a cooling device arranged inside said tank to cool said product.

Preferably, said cooling device comprises a coil evaporator arranged inside a tubular body, substantially cylindrical, mounted with horizontal axis inside said tank.

Preferably, said mixing device comprises a screw member that extends on the internal surface of said cylindrical body and is operated in rotation by a shaft that axially crosses the same cylindrical body of the cooling device.

DESCRIPTION OF DRAWINGS

Details of the invention shall be more apparent from the detailed description of a preferred embodiment of the apparatus for preparing and dispensing refrigerated products according to the invention, illustrated for indicative purposes in the attached drawings, wherein.

BEST MODE

Figure 1:
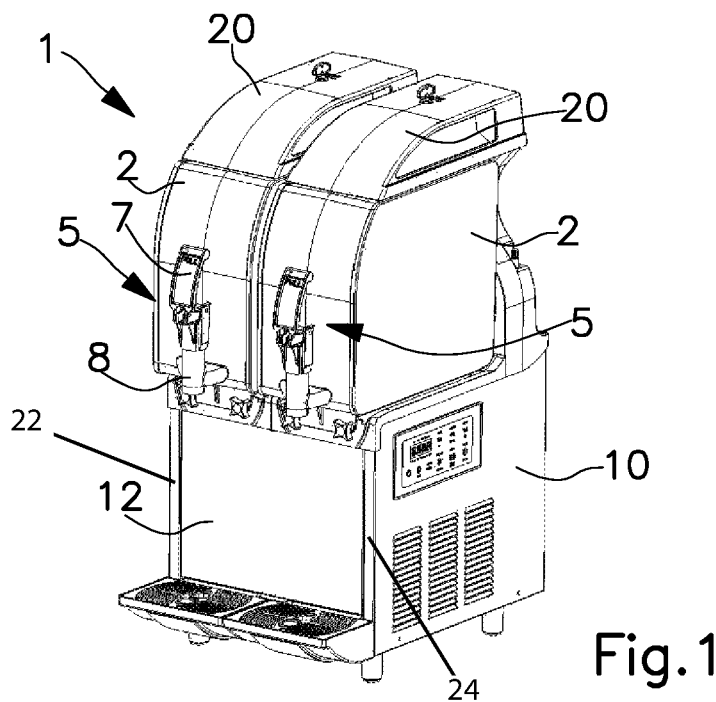
FIG. 1 shows a perspective view of the apparatus according to the invention.

With particular reference to such figures, the apparatus for preparing and dispensing refrigerated products, such as for example water ice, creamy ice-creams, sorbets and the like, according to the invention is indicated in its entirety with 1.

The apparatus 1 comprises at least one tank 2 for containing the product to be dispensed, made preferably of plastic transparent material. In the illustrated case, the apparatus provides two tanks 2 for containing the product, arranged side by side to prepare and dispense different products, but it is obviously possible to provide a different number of these tanks 2, in particular one single tank. The tanks 2 are open at their top and provided with a relative lid 20.

The two tanks are mounted on a single base body 10. The base body 10 has a substantially prismatic shape and is predisposed to contain inside the operative members of the apparatus, known per se. The base body has a first base body side portion 22, a second base body side portion 24, an upper base body portion 26 and a lower base body portion 28. In particular inside the base body 10 a refrigeration system 11 is housed which comprises, in substantially known manner, a compressor and a condenser.

Inside each containment tank 2 a mixing device 3 is arranged, comprising a screw member driven in rotation according to an axis longitudinal to the tank 2 to determine the continuous circulation of the product inside the same tank 2. The blades of the screw member 3 are predisposed to keep mixed the product and to convey it towards the front zone of the tank 2, where the dispensing zone is arranged.

Inside the tank 2 a cooling device 4 is arranged for cooling the product until the suitable temperature. The cooling device 4 is preferably made up of a coil evaporator 14 arranged inside a tubular body 15, substantially cylindrical. The cylindrical body 15 is mounted with horizontal axis, according to the above mentioned rotation axis of the screw member.

The containment tank 2 frontally has a dispensing device 5 connected with the lower portion of the same tank 2. The dispensing device 5 is provided with an obturator member 6 that can be operated by an outer lever member 7. The obturator member 6 is sliding inside a cylindrical seat constituted, with substantially vertical axis, by a sleeve 8 shaped by the tank 2. More precisely the obturator 6 is mobile, in known manner, by abutting elastic means, between a closure position and an open position of the opening of the sleeve 8.

Inside the containment tank 2 a heat sensor is further arranged, being predisposed to control the temperature of the product at the dispensing zone. The heat sensor is preferably protruding at the front of the cylindrical body 15 of the cooling device 4, close to the front wall of the tank 2.

The screw member of the mixing device 3 extends on the external surface of the cylindrical body 15 and is driven in rotation by a shaft 16 that axially crosses the same cylindrical body 15. The shaft 16 is predisposed to be operated by a motor member, preferably an electric motor, through a suitable reduction member.

Figure 2:
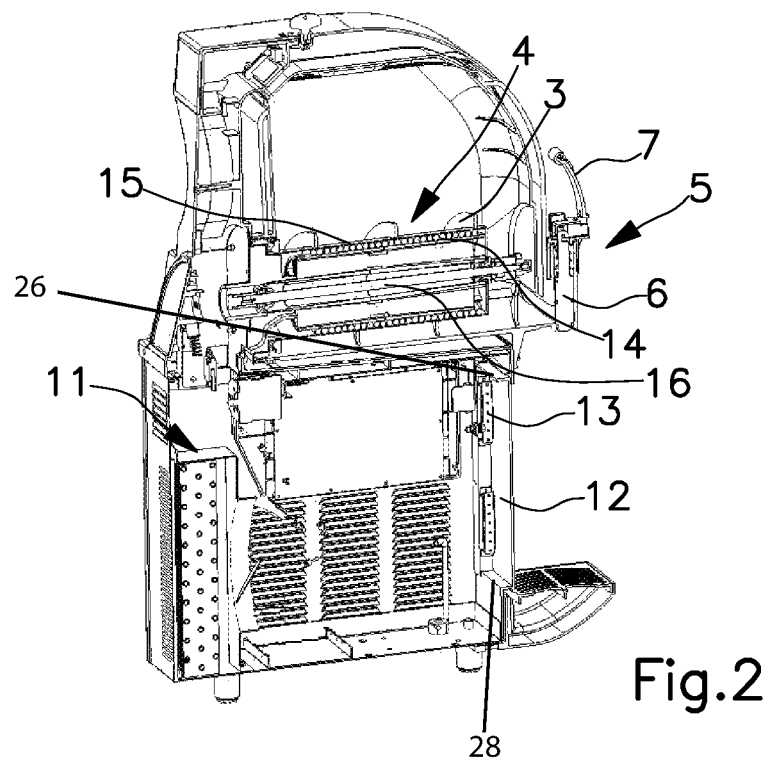
FIG. 2 shows a perspective view of the apparatus in cross-section according to a longitudinal plane to show the internal elements.

The base body 10 is closed at the front by a panel 12 of polycarbonate, transparent or opaque. The panel 12 is backlit by means of suitable lighting members 13, preferably of the LED type. As it is shown in FIGS. 1 and 2, the LEDs 13 are suitably arranged aligned vertically on opposite sides of the panel 12.

The functioning of the apparatus is easy to understand from the preceding description.

After the introduction of the product in the tank 2, through the upper opening, the preparation cycle is started, that is, the product is progressively refrigerated, passing from the liquid state to the frozen state for example of the water ice. In particular, the cooling device 4 is operated and the screw member of the mixing device 3 is driven in rotation at a predetermined speed.

When required, the product is dispensed, by operating in opening the dispensing device 5 through the lever member 7.

In use, the front panel 12 of the base body 10 is backlit through the LED lights 13. In this way, at the front part of the apparatus, a wide lighted surface is created. This wide surface enables the user to apply images to his choice and the like. The backlit of the same surface allows to give particular significance and vividness to the applied image.

Figure 3:
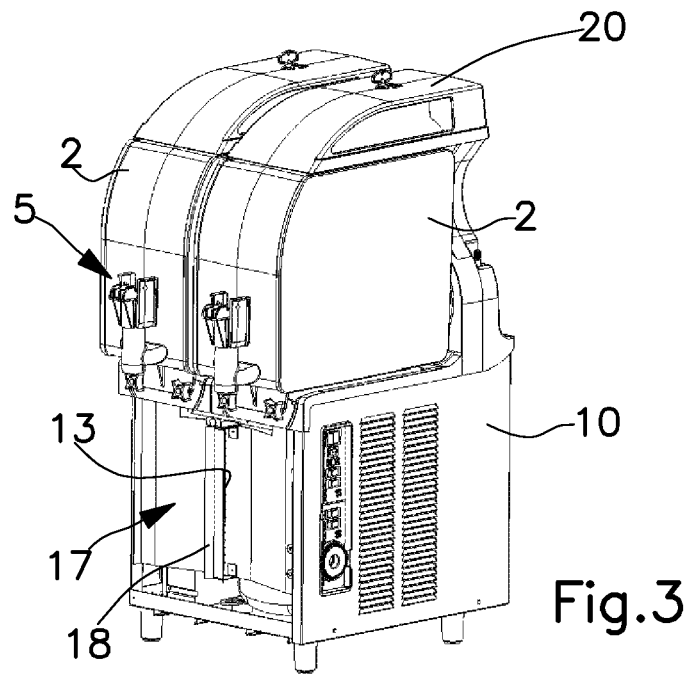
FIG. 3 shows a perspective view of a different embodiment of the apparatus with removed parts to show the inner parts.
Figure 4:
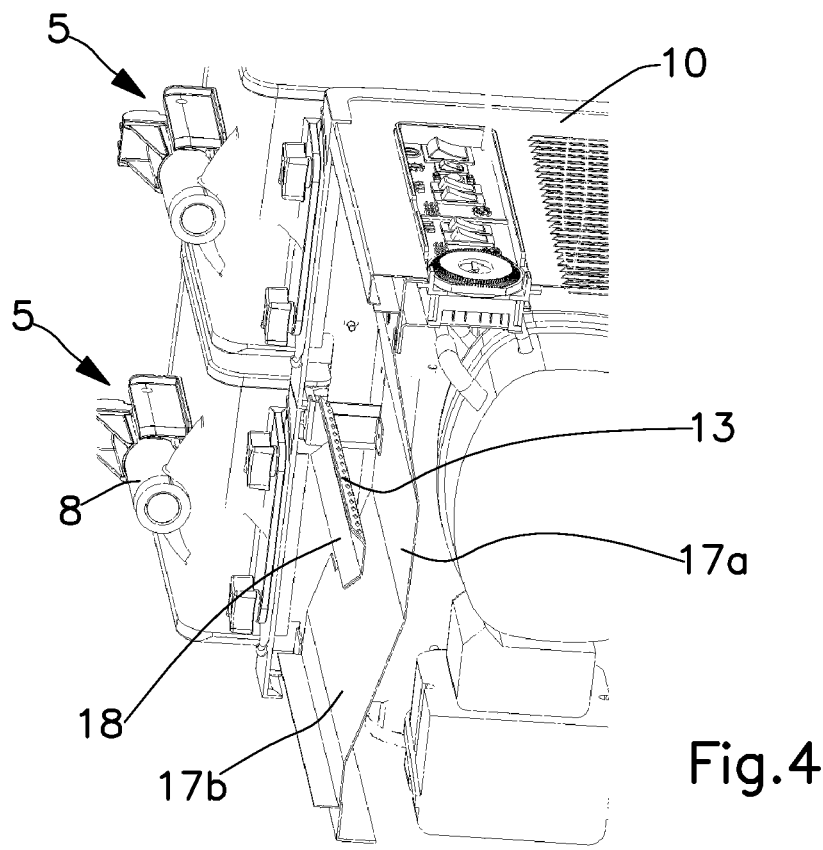
FIG. 4 shows a perspective view from a different angle of a part of the apparatus of FIG. 3.

In FIGS. 3 and 4 a different embodiment of the apparatus is shown in which in front of the panel 12, inside the base body 10, a deflector member 17 is arranged predisposed to spread the light emitted by the LED lighting members 13. In particular the deflector 17 is constituted by a plate suitably shaped and of a material predisposed to reflect the lighting beams emitted by the LED 13. In the illustrated case, this plate shapes a central portion 17a and side portions 17b vertically extended in assembly position; the side portions 17b are symmetrically angled with respect to the central portion 17a, so as to make the plate take a concave configuration. Obviously, it is possible to provide that the deflector 17 has a shape different from the one illustrated, in particular that the concave zone of the plate is defined by a curved surface, for example a cylindrical zone.

In the illustrated case, the LED lights 13 are mounted on a support 18 that extends vertically in front of the deflector 17, in a position median with respect to the base body 10. In particular, the support 18 is usefully constituted by a profile longitudinally shaping a central portion and a couple of lateral portions symmetrically angled according to the profile defined by the opposed portions 17a, 17b of the deflector 17. Practically, the LED lights 13 mounted on the different portions of the support 18 direct the light beams towards the respective opposite portions 17a, 17b of the deflector 17. Such opposite portions 17a, 17b reflect the light on the front panel 12 of the base body 10.

In substance, the deflector 17 has the function of diffusing the light emitted by the LEDs 13 so as to obtain a uniform lighting on the whole front panel 12.

Figure 5:
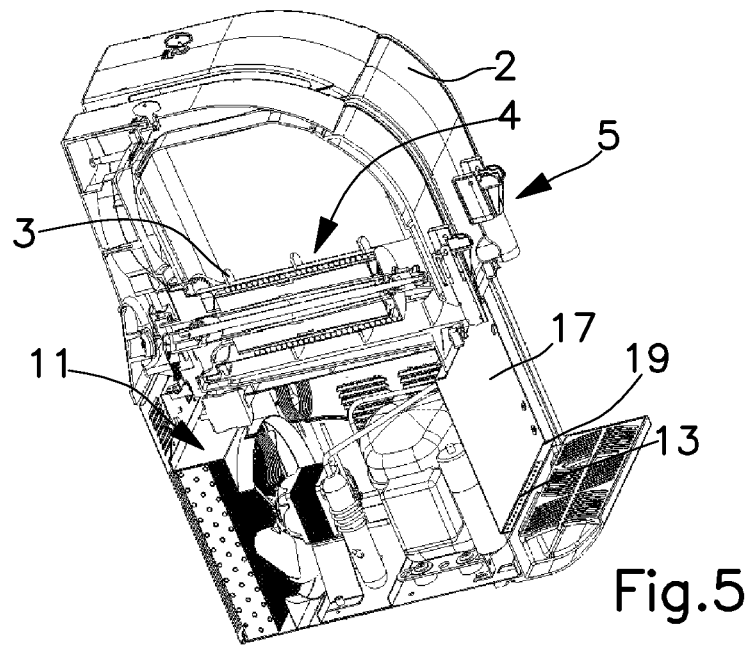
FIG. 5 shows a perspective view of a further embodiment of the apparatus in cross-section according to a longitudinal plane.
Figure 6:
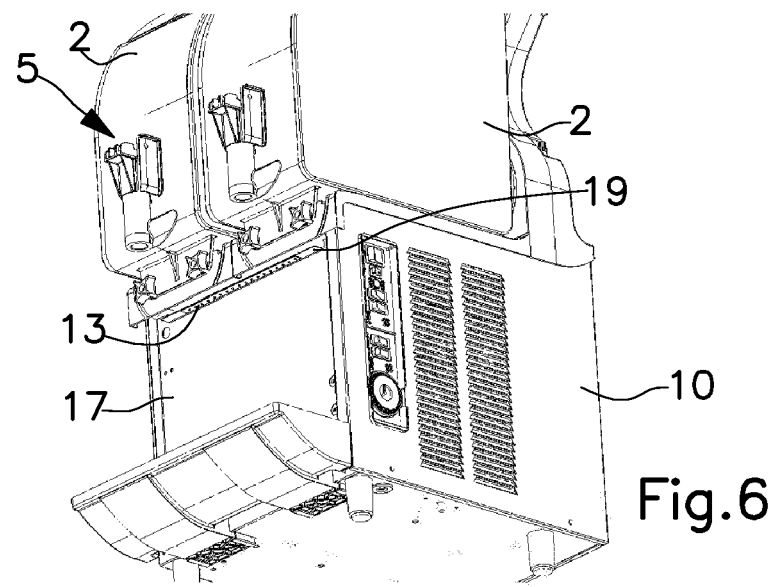
FIG. 6 shows a perspective view from a different angle of a portion of the apparatus of FIG. 5, with removed parts to show inner parts.

In FIGS. 5 and 6 a further embodiment of the deflector 17 is illustrated that provides the use of a plate having a flat surface turned towards the front panel 12. In substance this plate is arranged on a plane parallel to the front panel 12 inside the base body 10. The LED lights 13 are mounted along the upper side and along the lower side of the flat plate 17 on respective supports 19 transversely protruding from the same plate. In particular, the supports 19 are constituted by fillets that substantially extend for the whole length of the above mentioned upper and lower sides of the plate 17. The LED lights 13 are arranged in series, regularly spaced, along the fillets.

The apparatus according to the invention therefore attains the scope of offering to the user a high level of customization.

A feature of the invention is that the panel of polycarbonate presents lightness, brightness and high resistance to operating temperatures of the apparatus. The panel is also easy to clean, so as to preserve its visual qualities over time.

Another advantageous aspect of the invention is given by the fact that the LED backlit panel it is easily mountable also on existing machines and it can thus enable to give such existing machines an innovative aspect.

The equipment described by way of example is susceptible of numerous modifications and variations according to the different needs. In the preceding description reference has been made to an apparatus for preparing and dispensing of refrigerated products; it is however evident that the backlit panel according to the invention can be advantageously applied also to equipment for preparing and dispensing hot beverages and the like.

In practice, the embodiment of the invention, the materials used, as well as the shape and dimensions, may vary depending on the requirements.

Should the technical characteristics mentioned in each claim be followed by reference signs, such reference signs were included strictly with the aim of enhancing the understanding the claims and hence they shall not be deemed restrictive in any manner whatsoever on the scope of each element identified for exemplifying purposes by such reference signs.

The invention claimed is:

1. An apparatus for preparing and dispensing food products, the apparatus comprising:
   at least one containment tank predisposed to contain a product to be prepared and dispensed;
   a base body having a substantially prismatic shape on which said containment tank is mounted;
   a mixing device arranged inside said tank and predisposed to cause continuous circulation of the product inside the tank, to convey the product towards a front zone of said tank;
   a dispenser device of the product, placed at said front zone of the containment tank, wherein said base body is closed at the front by a panel of transparent or opaque material, said panel of transparent or opaque material shaping an outer wall of said base body, configured to be entirely visibly by a user, said panel being backlit by a lighting means, said lighting means being fixed to a support, said support being located at a spaced location from a rear surface of said panel.

2. An apparatus according to claim 1, wherein said panel is made of polycarbonate, wherein said lighting means is fixed exclusively to said support.

3. An apparatus according to claim 1, wherein said lighting means is a type of LED.

4. An apparatus according to claim 1, wherein said lighting means is arranged at opposite sides of said panel.

5. An apparatus according to claim 1, further comprising:
   a cooling device arranged inside said tank to cool said product, said lighting means being located at a spaced location from said panel.

6. An apparatus according to claim 1, wherein said panel shapes a surface on which an image of user's choice can be attached.

7. An apparatus according to claim 1, wherein a deflector member is disposed in front of said panel, said deflector member being inside said base body, said deflector member being predisposed to spread light emitted by said lighting means.

8. An apparatus according to claim 7, wherein said deflector member comprises a plate having a concave surface directed toward said panel.

9. An apparatus according to claim 8, wherein said support extends vertically in front of said deflector member, in a position median with respect to said base body.

10. An apparatus according to claim 7, wherein said support extends vertically in front of said deflector member, in a position median with respect to said base body.

11. An apparatus according to claim 7, wherein said deflector member comprises a plate having a flat surface arranged on a plane parallel to said panel, inside said base body.

12. An apparatus according to claim 7, wherein said support is arranged in front of said deflector member.

13. An apparatus according to claim 7, wherein said support extends vertically or horizontally in front of said deflector member.

14. An apparatus according to claim 2, wherein said lighting means is a type of LED.

15. An apparatus according to claim 1, wherein said lighting means is a type of LED.

16. An apparatus for preparing and dispensing food products, the apparatus comprising:
   a containment tank for containing a product to be prepared and dispensed;
   a base body having a substantially prismatic shape, a first base body side portion, a second base body side portion, an upper base body portion and a lower base body portion, said first base body side portion, said second base body side portion, said upper base body portion and said lower base body portion defining a front opening of said base body, said containment tank being mounted on said base body;
   a lighting device support structure connected directly to said base body;
   a mixing device arranged inside said tank, said mixing device being configured to continuously circulate the product in the tank;
   a dispenser device of the product, said dispenser device being connected to the containment tank;
   a transparent or opaque panel extending from said first base body side portion to said second base body side portion and said transparent or opaque panel extending from said upper base body portion to said lower base body portion, wherein said transparent or opaque panel completely closes said front opening and said transparent or opaque panel defines an outer wall of said base body, said outer wall being configured to be entirely visible by a user of the apparatus;
   a lighting device fixed to said lighting device support structure for backlighting said transparent or opaque panel, said lighting device support structure and said lighting device being located adjacent to said transparent or opaque material, said lighting device support structure being located at a spaced location from a rear surface area of said panel.

17. An apparatus according to claim 16, wherein said lighting device is arranged at opposite sides of said panel, wherein said lighting device support structure is arranged in front of a deflector member.

18. An apparatus according to claim 16, wherein an image of a user's choice is provided on said panel via said lighting device, wherein said lighting device support structure extends vertically or horizontally in front of a deflector member.

19. An apparatus according to claim 16, wherein a deflector member is disposed in front of said panel, said deflector member being inside said base body, said deflector member being predisposed to spread light emitted by said lighting device, said lighting device being set on said light device support structure which extends vertically in front of said deflector member, in a position median with respect to said base body.

20. An apparatus according to claim 16, wherein a deflector member is disposed in front of said panel, said deflector member being inside said base body, said deflector member being predisposed to spread light emitted by said lighting device, said deflector member comprising a plate having a concave surface directed toward said panel, said lighting device being set on said light device support structure which extends vertically in front of said deflector member, in a position median with respect to said base body.

* * * * *